(12) United States Patent
Conover et al.

(10) Patent No.: US 9,015,706 B2
(45) Date of Patent: Apr. 21, 2015

(54) TECHNIQUES FOR INTERACTION WITH A GUEST VIRTUAL MACHINE

(75) Inventors: Matthew Conover, East Palo Alto, CA (US); Bruce McCorkendale, Manhattan Beach, CA (US); William E. Sobel, Jamul, CA (US)

(73) Assignee: Symantec Corporation, Mountain View, CA (US)

( * ) Notice: Subject to any disclaimer, the term of this patent is extended or adjusted under 35 U.S.C. 154(b) by 739 days.

(21) Appl. No.: 12/832,550

(22) Filed: Jul. 8, 2010

(65) Prior Publication Data

US 2012/0011499 A1 Jan. 12, 2012

(51) Int. Cl.
G06F 9/455 (2006.01)
G06F 21/57 (2013.01)

(52) U.S. Cl.
CPC .......... *G06F 21/577* (2013.01); *G06F 9/45537* (2013.01); *G06F 2009/45591* (2013.01)

(58) Field of Classification Search
None
See application file for complete search history.

(56) References Cited

U.S. PATENT DOCUMENTS

| | | | | |
|---|---|---|---|---|
| 2005/0235285 A1* | 10/2005 | Monasterio | ............... | 718/100 |
| 2008/0155092 A1* | 6/2008 | Kumar et al. | ............... | 709/224 |
| 2009/0037926 A1* | 2/2009 | Dinda et al. | ............... | 718/107 |
| 2009/0113426 A1* | 4/2009 | Mizuno | ............... | 718/1 |
| 2010/0083250 A1 | 4/2010 | Nakai | | |
| 2010/0095000 A1* | 4/2010 | Kettler et al. | ............... | 709/226 |
| 2010/0192152 A1* | 7/2010 | Miyamoto et al. | ............ | 718/102 |
| 2011/0082962 A1* | 4/2011 | Horovitz et al. | ............... | 711/6 |

OTHER PUBLICATIONS

Lares: An Architecture for Secure Active Monitoring Using Virtualization Bryan D. Payne, Martim Carbone, Monirul Sharif, Wenke Lee Published: 2008.*
Managing the Performance Impact of Administrative Utilities Sujay Parekh, Kevin Rose, Joseph Hellerstein, Sam Lightstone, Matthew Huras, and Victor Chang Published: 2003.*
Friendly Virtual Machines: Leveraging a Feedback-Control Model for Application Adaptation Yuting Zhang, Azer Bestavros, Mina Guirguis, Ibrahim Matta, Richard West Published: 2005.*
Enhancing virtual environments with QoS aware resource management Fernando Rodriguez-Haro, Felix Freitag, Leandro Navarro Published: 2008.*
Best Practice for Symantec Endpoint Protection Scheduled Scans in VMWare, Article ID: TECH95928; Symantec Endpoint Protection scan tuning options, Article ID: TECH105706 Published: None later then Jan. 13, 2010.*
Antfarm: Tracking Processes in a Virtual Machine Environment Stephen T. Jones, Andrea C. Arpaci-Dusseau, and Remzi H. Arpaci-Dusseau Published: 2006.*

(Continued)

*Primary Examiner* — Emerson Puente
*Assistant Examiner* — Paul Mills
(74) *Attorney, Agent, or Firm* — Wilmer Cutler Pickering Hale and Dorr LLP

(57) ABSTRACT

Techniques for inter-virtual machine communication are disclosed. In one particular exemplary embodiment, the techniques may be realized as a method for interaction with a guest virtual machine comprising monitoring image loads into electronic memory of a guest virtual machine using a secure virtual machine, identifying a memory structure having a specified format, and performing, using the secure virtual machine, at least one of reading one or more portions of the identified memory structure and setting a value in the identified memory structure.

17 Claims, 5 Drawing Sheets

(56) References Cited

OTHER PUBLICATIONS

Automated Control of Multiple Virtualized Resources Pradeep Padala, Kai-Yuan Hou, Kang G. Shin, Xiaoyun Zhu, Mustafa Uysal, Zhikui Wang, Sharad Singhal, Arif Merchant Published: 2008.*
Guest-Aware Priority-Based Virtual Machine Scheduling for Highly Consolidated Server Dongsung Kim, Hwanju Kim, Myeongjae Jeon, Euiseong Seo, and Joonwon Lee Published: 2008.*
Plato: A Platform for Virtual Machine Services Samuel T. King, George W. Dunlap, and Peter M. Chen Published: 2004.*
International Search Report and Written Opinion mailed on Dec. 7, 2011, for International Application No. PCT/US2011/41196 filed Jun. 21, 2011 (10 pages).
Menasce et al., "Virtualization: Concepts, applications, and performance modeling," Internet Citation, pp. 1-7 (Jan. 1, 2005).
Menon et al., "Diagnosing performance overhead in the Xen Virtual Machine environment," Proceedings of the First ACM/USENIX International Conference on virtual execution environnments, VEE'05, pp. 13-23 (Jun. 11, 2005).
Data Sheet, "McAfee Enterprises Security Suite Solutions," McAfee Systems Protection Solutions; McAfee, Inc.; 2006; 4 pages; http://www.mcafee.com/elqNow/elqRedir.htm?ref=http://www.mcafee.com/us/local_content/datasheets/ds_ent_security_suite_solns.pdf.
Data Sheet, "Worry-Free™ Business Security Advanced and Standard #1 for Small Business Security," Worry-Free Security Solutions; Trend Micro; 2010; 2 pages; http://us.trendmicro.com/imperia/md/content/us/pdf/products/smallbusiness/worry-freebusinesssecurity/worryfreebusinesssecuritydatasheet.pdf.
Desktop Optimization Pack; "App-V Security Best Practices," Microsoft Corporation; 2008; 25 pages; http://www.google.com/url?q=http://download.microsoft.com/download/f/7/8/f784a197-73be-48ff-83da-4102c05a6d44/AppV_Security_Best_Practices.docx&sa=S&ei=HyWqTI_cloG0IQeh9N2YDg&ved=0CBsQzgQoATAA&usg=AFQiCNHRJ7CEhTy338MkcTH3hcFTMsAYdw.
Data Sheet, "VMware vShield Endpoint—Endpoint Security for Virtual Detacenters" VMware; 2010; 2 pages; http://www.vmware.com/files/pdf/vmware-vshield-endpoint-ds-en.pdf.
Citrix, "Citrix XenServer® 5.6 Virtual Machine Installation Guide," Citrix, Inc.; 2009; 58 pages; http://support.citrix.com/servlet/KbServlet/download/23830-102-645654/guest.pdf.

* cited by examiner

TECHNIQUES FOR INTERACTION WITH A GUEST VIRTUAL MACHINE

FIELD OF THE DISCLOSURE

The present disclosure relates generally to inter-virtual machine communication and, more particularly, to techniques for interaction with a guest virtual machine.

BACKGROUND OF THE DISCLOSURE

Virtual machines may be designed to utilize whatever resources they are configured to appear to have regardless of the state of an underlying physical platform. An underlying physical platform may contain a plurality of guest virtual machines which in total are configured to use more resources than actually present on the physical platform (e.g., three virtual guest virtual machines may each be configured to use ten gigabytes of memory when the underlying host contains only twenty gigabytes of memory). A guest virtual machine may be unable to determine the state of an underlying platform (e.g., available resources) and the state of other virtual machines running on an underlying platform. As a result, a guest virtual machine may attempt to use more resources than are currently available on an underlying platform. Processes running on a guest virtual machine may have no way to receive a communication indicating a status from another virtual machine.

In view of the foregoing, it may be understood that there may be significant problems and shortcomings associated with current virtual machine communication technologies.

SUMMARY OF THE DISCLOSURE

Techniques for inter-virtual machine communication are disclosed. In one particular exemplary embodiment, the techniques may be realized as a method for interaction with a guest virtual machine comprising monitoring image loads into electronic memory of a guest virtual machine using a secure virtual machine, identifying a memory structure having a specified format, and performing, using the secure virtual machine, at least one of reading one or more portions of the identified memory structure and setting a value in the identified memory structure.

In accordance with other aspects of this particular exemplary embodiment, the image loads may comprise at least one of: loads of executable code and loads of dynamic link libraries.

In accordance with further aspects of this particular exemplary embodiment, the specified format may comprise tagged control blocks.

In accordance with additional aspects of this particular exemplary embodiment, the method may further include identifying a handler to handle the identified memory structure based at least in part on a portion of data in the identified memory structure.

In accordance with additional aspects of this particular exemplary embodiment, the portion of data in the identified memory structure may comprise at least one of version data indicating a particular version of inter-virtual machine communication syntax, a type string indicating a type of inter-virtual machine communication, and length data indicating a length of the communication data.

In accordance with additional aspects of this particular exemplary embodiment, the method may further include reading the value set in the identified memory structure using the guest virtual machine, and performing at least one action by the guest virtual machine in response to reading the at least one value.

In accordance with additional aspects of this particular exemplary embodiment, the method may further include monitoring one or more platform environment attributes of an underlying physical platform using the secure virtual machine.

In accordance with additional aspects of this particular exemplary embodiment, the one or more platform environment attributes may include at least one of: CPU utilization, memory utilization; network utilization; and storage utilization.

In accordance with additional aspects of this particular exemplary embodiment, the method may include determining that one or more platform attributes exceed a specified threshold, identifying a guest virtual machine process for which resource consumption will be reduced, setting a value in an identified memory structure corresponding to the identified guest virtual machine process, reading the value set in the identified memory structure corresponding to the identified guest virtual machine process using the guest virtual machine, and performing at least one action by the guest virtual machine in response to reading the at least one value to reduce resource consumption by the identified guest virtual machine process.

In accordance with additional aspects of this particular exemplary embodiment, the value set in the identified memory structure may comprise a setting indicating a configurable throttle value to the identified guest virtual machine process, the configurable throttle value causing the identified guest virtual machine process to reduce usage of CPU resources proportionate to the configurable throttle value.

In accordance with additional aspects of this particular exemplary embodiment, the process may comprise at least one of a virus scanning process, an antivirus update process, a data backup process, and a data restoration process.

In accordance with additional aspects of this particular exemplary embodiment, identifying a guest virtual machine process for which resource consumption will be reduced may comprise using guest virtual machine process information provided via exported tagged control blocks to the secure virtual machine.

In accordance with additional aspects of this particular exemplary embodiment, monitoring image loads into electronic memory of a guest virtual machine using a secure virtual machine may comprise detecting the loading of a process known by the secure virtual machine to provide exported tagged control blocks.

In accordance with additional aspects of this particular exemplary embodiment, reading one or more portions of the identified memory structure may comprise reading exported guest virtual machine process information.

In accordance with additional aspects of this particular exemplary embodiment, the exported guest virtual machine process information may comprise a current number of copies of a particular process running on the guest virtual machine.

In accordance with additional aspects of this particular exemplary embodiment, the techniques may be realized as at least one non-transitory processor readable storage medium for storing a computer program of instructions configured to be readable by at least one processor for instructing the at least one processor to execute a computer process for performing the method.

In another particular exemplary embodiment, the techniques may be realized as an article of manufacture for interaction with a guest virtual machine, the article of manufacture which may comprise at least one non-transitory processor readable medium, and instructions stored on the at least one medium, wherein the instructions are configured to be readable from the at least one medium by at least one processor and thereby cause the at least one processor to operate so as to monitor image loads into electronic memory of a guest virtual machine using a secure virtual machine, identify a memory structure having a specified format, and perform, using the secure virtual machine, at least one of: reading one or more portions of the identified memory structure, and setting a value in the identified memory structure.

In another particular exemplary embodiment, the techniques may be realized as a system for interaction with a guest virtual machine comprising one or more processors communicatively coupled to a network; wherein the one or more processors are configured to monitor image loads into electronic memory of a guest virtual machine using a secure virtual machine, identify a memory structure having a specified format, and perform, using the secure virtual machine, at least one of: reading one or more portions of the identified memory structure, and setting a value in the identified memory structure.

In accordance with additional aspects of this particular exemplary embodiment, the specified format may comprise tagged control blocks.

In accordance with additional aspects of this particular exemplary embodiment, the one or more processors may further be configured to: identify a handler to handle the identified memory structure based at least in part on a portion of data in the identified memory structure.

In accordance with additional aspects of this particular exemplary embodiment, the one or more processors may further be configured to: read the value set in the identified memory structure using the guest virtual machine, and perform at least one action by the guest virtual machine in response to reading the at least one value.

The present disclosure will now be described in more detail with reference to exemplary embodiments thereof as shown in the accompanying drawings. While the present disclosure is described below with reference to exemplary embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

DETAILED DESCRIPTION OF EXEMPLARY EMBODIMENTS

Figure 1:
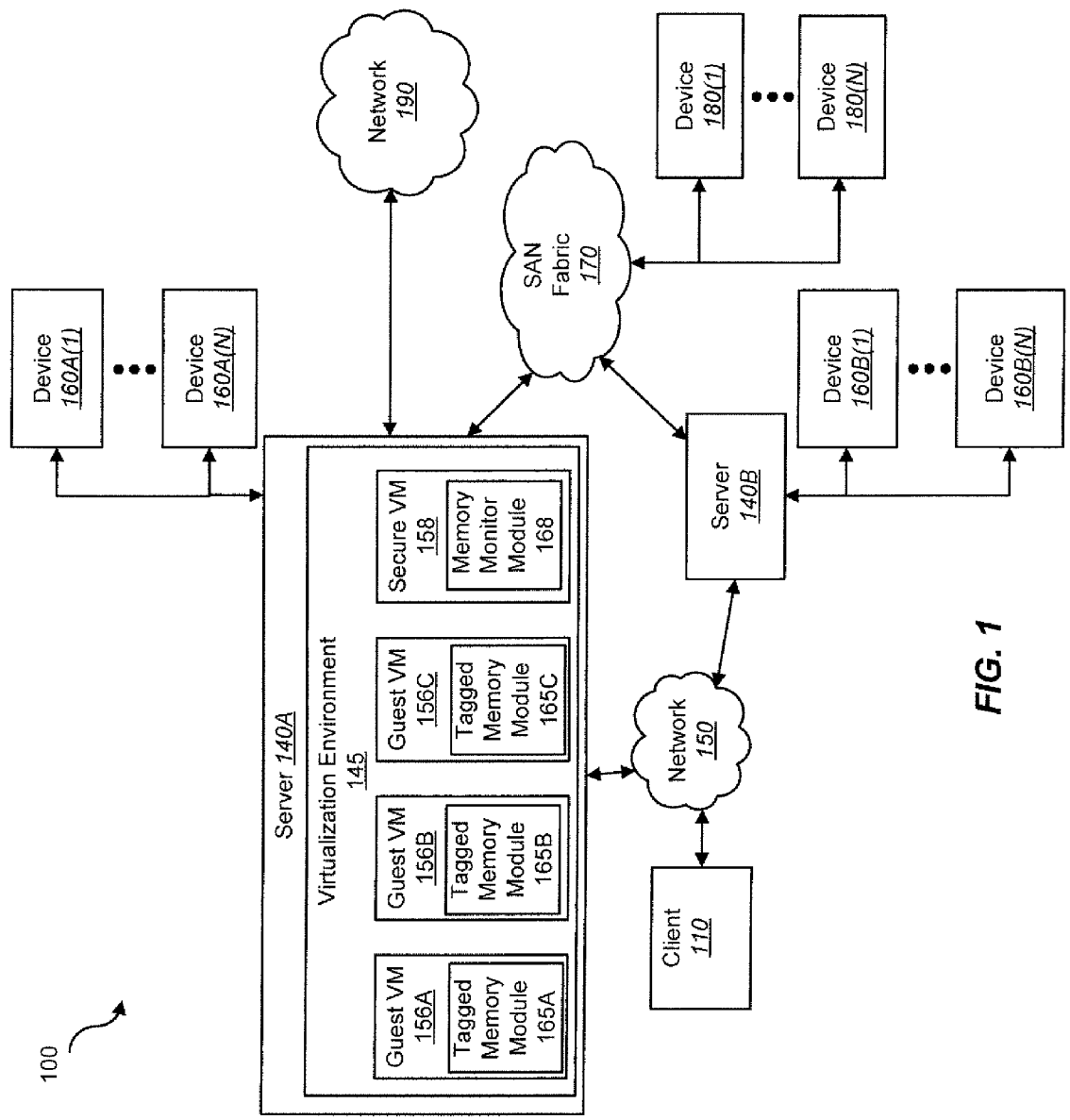
FIG. 1 shows a block diagram depicting a network architecture containing a platform for inter-virtual machine communication in accordance with an embodiment of the present disclosure.

FIG. 1 shows a block diagram depicting a network architecture 100 for inter-virtual machine communication in accordance with an embodiment of the present disclosure. FIG. 1 is a simplified view of network architecture 100, which may include additional elements that are not depicted. Network architecture 100 may contain client system 110 as well as servers 140A and 140B (one or more of which may be implemented using computer system 200 shown in FIG. 2). Client system 110 may be communicatively coupled to a network 150. Server 140A may be communicatively coupled to storage devices 160A(1)-(N), and server 140B may be communicatively coupled to storage devices 160B(1)-(N). Servers 140A and 140B may contain a management module (e.g., tagged memory interaction management module 154 of server 140A). Servers 140A and 140B may be communicatively coupled to a SAN (Storage Area Network) fabric 170. SAN fabric 170 may support access to storage devices 180(1)-(N) by servers 140A and 140B, and by client system 110 via network 150. Server 140A may be communicatively coupled to network 190. Server 140A may be a platform hosting a virtualization environment 145. Virtualization environment 145 may be capable of supporting one or more virtual machines such as, for example, guest virtual machines 156A-156C and secure virtual machine 158. Guest virtual machines 156A-156C may contain tagged memory modules 165A-165C. Secure virtual machine 158 may contain memory monitor module 168. As discussed in greater detail below tagged memory modules 165A-165C and memory monitor module 168 may allow communication and interaction between virtual machines (e.g., between guest virtual machines and a secure virtual machine).

Figure 2:
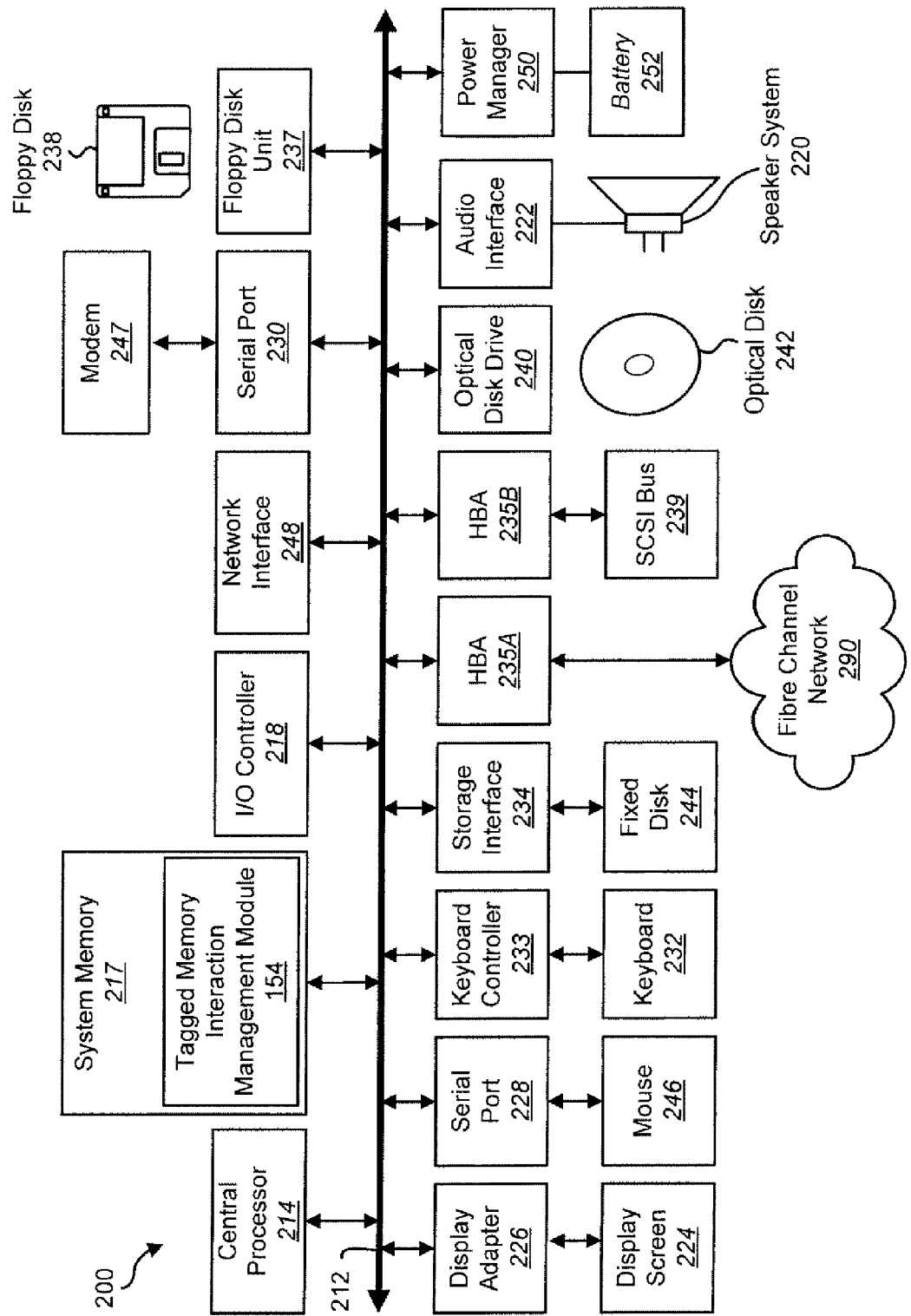
FIG. 2 depicts a block diagram of a computer system in accordance with an embodiment of the present disclosure.

With reference to computer system 200 of FIG. 2, modem 247, network interface 248, or some other method may be used to provide connectivity from one or more of client system 110 to network 150. Client system 110 may be able to access information on server 140A or 140B using, for example, a web browser or other client software. Such a client may allow client system 110 to access data hosted by server 140A or 140B or one of storage devices 160A(1)-(N), 160B(1)-(N), and/or 180(1)-(N).

Networks 150 and 190 may be local area networks (LANs), wide area networks (WANs), the Internet, cellular networks, satellite networks, or other networks that permit communication between client 110, servers 140, and other devices communicatively coupled to networks 150 and 190. Networks 150 and 190 may further include one, or any number, of the exemplary types of networks mentioned above operating as a stand-alone network or in cooperation with each other. Networks 150 and 190 may utilize one or more protocols of one or more clients or servers to which they are communicatively coupled. Networks 150 and 190 may translate to or from other protocols to one or more protocols of network devices. Although networks 150 and 190 are each depicted as one network, it should be appreciated that according to one or more embodiments, networks 150 and 190 may each comprise a plurality of interconnected networks.

Storage devices 160A(1)-(N), 160B(1)-(N), and/or 180(1)-(N) may be network accessible storage and may be local, remote, or a combination thereof to server 140A or 140B. Storage devices 160A(1)-(N), 160B(1)-(N), and/or 180(1)-(N) may utilize a redundant array of inexpensive disks ("RAID"), magnetic tape, disk, a storage area network ("SAN"), an Internet small computer systems interface ("iSCSI") SAN, a Fibre Channel SAN, a common Internet File System ("CIFS"), network attached storage ("NAS"), a network file system ("NFS"), optical based storage, or other computer accessible storage. Storage devices 160A(1)-(N), 160B(1)-(N), and/or 180(1)-(N) may be used for backup or archival purposes.

According to some embodiments, client 110 may be a smartphone, PDA, desktop computer, a laptop computer, a server, another computer, or another device coupled via a wireless or wired connection to network 150. Client 110 may receive data from user input, a database, a file, a web service, and/or an application programming interface.

Servers 140A and 140B may be application servers, archival platforms, backup servers, network storage devices, media servers, email servers, document management platforms, enterprise search servers, or other devices communicatively coupled to network 150. Servers 140A and 140B may utilize one of storage devices 160A(1)-(N), 160B(1)-(N), and/or 180(1)-(N) for the storage of application data, backup data, or other data. Servers 140A and 140B may be hosts, such as an application server, which may process data traveling between client 110 and a backup platform, a backup process, and/or storage. According to some embodiments, servers 140A and 140B may be platforms used for backing up and/or archiving data.

Guest virtual machines 156A-156C of virtualization environment 145 may use a predefined communication scheme with secure virtual machine 158. Guest virtual machines 156A-156C may contain tagged memory modules 165A-165C which may export one or more memory structures using a format agreed upon with secure virtual machine 158 (e.g., tagged control blocks). An exported memory structure from a guest virtual machine may provide information to a secure virtual machine or may allow a secure virtual machine to set one or more parameters. For example, tagged memory module 165A of guest virtual machine 156A may export a memory structure containing information about one or more processes running on guest virtual machine 156A (e.g., virus scanning processes, antivirus update processes, etc.). Secure virtual machine 158 may use memory monitor module 168 to detect memory structures using an agreed upon or specified format. Secure virtual machine 158 may consume or read such exported memory structures. Consumption of exported memory structures may allow secure virtual machine 158 to monitor the number, type, and status of one or more processes on a guest virtual machine. Guest virtual machines may also provide other data in exported memory structures.

Tagged memory module 165A of guest virtual machine 156A may also export a memory structure containing one or more parameters which may be settable by memory monitor module 168 of secure virtual machine 158. Secure virtual machine 158 may detect memory structures using a specified format and may set one or more parameters in the exported memory structures. For example, guest virtual machine 156A may export a tagged memory structure using tagged memory module 165A. According to some embodiments, the tagged memory structure may provide one or more parameters that may govern resource consumption of a process running on guest virtual machine 156A. The tagged memory structure may default to a value which may allow a guest virtual machine to use as much resources as the virtual machine is allocated.

Secure virtual machine 158 may monitor an underlying platform such as, for example, server 140A. Memory monitor module 168 of secure virtual machine 158 may monitor storage, CPU utilization, memory, network Input/Output (I/O) and other criteria. Secure virtual machine 158 may be a management component of a virtualization platform such as a hypervisor. Secure virtual machine 158 may thus have access to platform resource information which is unavailable to guest virtual machines. According to some embodiments, Secure virtual machine 158 may also one or more hypervisor APIs to monitor memory loads of a guest virtual machine.

According to some embodiments, one or more utilization thresholds may be specified such as, for example, a maximum CPU utilization, a maximum memory utilization, or other thresholds. If a threshold is met or exceeded, memory monitor module 168 may determine whether resource utilization of one or more virtual machines may be decreased. Memory monitor module 168 may use information about running processes on guest virtual machines which may have been provided by a guest virtual machine exporting tagged memory structures containing process data. According to some embodiments, Memory monitor module 168 may contain or access data about guest virtual machine process priority which may aid in the identification of a guest virtual machine process. According to some embodiments, Memory monitor module 168 may identify a guest virtual machine process which is the most resource intensive among identified guest virtual machine processes. Other factors may be used to identify a guest virtual machine process (e.g., a process start time, an estimated process completion time, etc.). Once a guest virtual machine process has been identified, Memory monitor module 168 may modify one or more parameters in an exported memory structure corresponding to the process. Parameters may be used by Memory monitor module 168 to signal to a guest virtual machine process to reduce consumption, to halt consumption, or for other purposes. For example, a parameter may be a "throttle value" in which any value above zero indicates a reduction in resource consumption (e.g., a parameter may express a time to wait in milliseconds between actions such as file scans). Other values may provide other process input. For example, a parameter may be set indicating that a process on a guest virtual machine is to halted or suspended. Thus, the identification of exported memory structures with a specific format or naming convention allows a secure virtual machine to receive information from a guest virtual machine or to provide information to a guest virtual machine.

According to some embodiments, secure virtual machine 158 may use memory monitor module 168 to watch for image loads of EXEs and DLLs in the guest VMs (GVMs). Secure virtual machine 158 may watch and look for exports with a specific naming convention. Software developers may support the naming convention in software run on a guest virtual machine and processes of this software may export memory structures to communicate with a management component such as, for example, a secure virtual machine. The exports may be data structures that can contain data that is meant for the secure virtual machine (SVM) to consume or to populate (or both). According to some embodiments, the exported data structures named according to the convention can be called "tagged control blocks".

According to at least one specific embodiment, the naming convention or format may use exported memory structures whose names may start with "SymSVM_". Exported memory structures may each be in their own page, aligned to start the first byte of the page, and the pages housing the exported tagged control blocks may be marked as non-pageable.

According to at least one embodiment, placing the control blocks in non-pageable memory may be done because a page write breakpoint may be used by a SVM to track state changes in the tagged control block. If the control block were pageable, it may cause a breakpoint every time there is a context switch. According to some embodiments, when first the SVM finds a tagged control block, the CR3 (Control Register 3) value associated with that process may be saved along with information about that tracked control block. If a page write breakpoint for that page is identified with a different CR3 value, it may indicate that the associated process has shut down or crashed because the page was unlocked and re-used by another process.

According to one or more embodiments, the tagged control blocks may each begin with a standard header that may include three pieces of information:
1. A version so that a particular format, naming convention, or scheme can be identified.
2. A type string.
3. The length of type specific data to follow.

The type string may specify a name associated with a specific type of tagged control block. For example, types of tagged control blocks may include:
  ClientDataStruct—contains data that may allow a SVM to identify the client to the management server.
  VMEnvironmentInfo—to be populated by the SVM with data about the GVM (Guest Virtual Machine) and the physical host on which this process is running.
  ScanControlStruct—may allow the SVM to know how many scans are going on in the containing GVM and may allow the SVM to specify a value that may cause the GVM to throttle its scans by pausing between files it processes for the specified number of milliseconds.

Using this scheme of having a common header with a type and length may allow a SVM to generically handle discovery and management of the tagged control blocks and hand off control-block type specific handling to a registered control-block type specific handler.

According to an embodiment tagged control blocks of ScanControlStruct may be implemented. In this embodiment, a guest virtual machine implementing security endpoint protection (an SEP client) may throttle scan functionality. If a SVM has provided a non-zero throttle value, the SEP client may now also throttle according to this specification. The SEP client may also keep the count of current scans in the Scan-ControlStruct updated if it starts or stops a scan so that the SVM may have this information. The SEP client may keep the data in the ClientDataStruct populated with up to date information used to identify that client to a management server. The SVM may use that information to get or set information about that client in a management system.

The corresponding SVM component for this scheme (e.g., memory monitor module 168) may now monitor overall load on a given physical host housing the GVMs under its purview. The SVM may now use this physical host load information as well as information from the GVMs about their scan status to shape the load patterns due to scanning activity within the GVMs. For example, if the physical system's load is high due to several scans going on within multiple GVMs, the SVM may instruct one or more GVM scans to throttle until the overall load on the physical system drops below a desired threshold. The SVM may implement a variety of approaches to manage load on the physical system while still ensuring that each GVM gets scanned (e.g., throttle GVMs until load is tolerable or only one GVM is left scanning, let the remaining scanning GVMs continue until one finishes, then release each of the others one at a time until all have completed their scans while capping the maximum load contribution of the overall set of GVM scans).

In addition to throttling virus scanning processes, antivirus update processes, or other processes, tagged memory block protocols or schemes may be used to communicate between a guest virtual machine and a management component (e.g., a SVM) for a variety of purposes.

According to an embodiment, the SVM discovery and processing of the tagged control blocks may be depicted at a high level as follows.

Image loads of processes containing tagged control blocks may be detected. This may be performed according to some embodiments by monitoring memory associated with processes known to a secure virtual machine as containing tagged memory blocks. A secure virtual machine may contain or access a list, a table, or other data indicating one or more processes containing tagged memory blocks.

Memory may be monitored by a secure virtual machine using an API for a virtualization environment and/or an API for a hypervisor. For example, according to some embodiments, a page breakpoint interrupt may be used on a debug service routine. This interrupt may be fired once per image load for both user-mode and kernel-mode images or at other intervals or trigger points. An interrupt, an API, or other memory access mechanism may enable a SVM to see one or more of the images loading in a guest virtual machine. Image load information may contain file names, file sizes, and other data (e.g., "LoadImage Filename 0x80548ef4 Info 0x80548ec4 Filename (27 bytes): \WINDOWS\system32\KDCOM.DLL").

A monitoring process or secure virtual machine may wait for an image load event of a specific process name, (e.g., "\Program Files\Symantec\rtvscan.exe") and check an export table containing associated exported memory structures once the specific process name is detected. The monitoring process or secure virtual machine may identify exports whose names follow a specified convention (e.g., tagged control blocks such as SymSVM_ScanContorlStruct). Once found, a monitoring process or secure virtual machine may take note of the location(s) and set up page write breakpoints on the discovered pages. A monitoring process may determine which guest virtual machine caused a triggering event or page write breakpoint on a discovered page.

If there are five virtual machines then there may be five page write breakpoints on five separate physical pages (each may contain a tagged control block structure for that VM). We may keep an array, a hash table, or another data structure in the SVM or accessible to the SVM that correlates the physical page address which caused the page write breakpoint to a VM.

Tagging memory control blocks may provide a generic mechanism for simple and effective communication (which may allow control) between specific processes in a guest VM (GVM) and a security VM (SVM) that implements this scheme. Monitoring of memory loads of a guest virtual machine by a security virtual machine may be performed using APIs of a hypervisor or virtualization environment. This may require only trivial additions to the traditional, physical infrastructure oriented software.

FIG. 2 depicts a block diagram of a computer system 200 in accordance with an embodiment of the present disclosure. Computer system 200 is suitable for implementing techniques in accordance with the present disclosure. Computer system 200 may include a bus 212 which may interconnect major subsystems of computer system 210, such as a central processor 214, a system memory 217 (e.g. RAM (Random Access Memory), ROM (Read Only Memory), flash RAM, or the like), an Input/Output (I/O) controller 218, an external audio device, such as a speaker system 220 via an audio output interface 222, an external device, such as a display screen 224 via display adapter 226, serial ports 228 and 230, a keyboard 232 (interfaced via a keyboard controller 233), a storage interface 234, a floppy disk drive 237 operative to receive a floppy disk 238, a host bus adapter (HBA) interface card 235A operative to connect with a Fibre Channel network 290, a host bus adapter (HBA) interface card 235B operative to connect to a SCSI bus 239, and an optical disk drive 240 operative to receive an optical disk 242. Also included may be a mouse 246 (or other point-and-click device, coupled to bus 212 via serial port 228), a modem 247 (coupled to bus 212 via serial port 230), network interface 248 (coupled directly to bus 212), power manager 250, and battery 252.

Bus 212 allows data communication between central processor 214 and system memory 217, which may include read-only memory (ROM) or flash memory (neither shown), and random access memory (RAM) (not shown), as previously noted. The RAM may be the main memory into which the operating system and application programs may be loaded. The ROM or flash memory can contain, among other code, the Basic Input-Output system (BIOS) which controls basic hardware operation such as the interaction with peripheral components. Applications resident with computer system 210 may be stored on and accessed via a computer readable medium, such as a hard disk drive (e.g., fixed disk 244), an optical drive (e.g., optical drive 240), a floppy disk unit 237, or other storage medium. For example, tagged memory interaction management module 154 may be resident in system memory 217.

Storage interface 234, as with the other storage interfaces of computer system 210, can connect to a standard computer readable medium for storage and/or retrieval of information, such as a fixed disk drive 244. Fixed disk drive 244 may be a part of computer system 210 or may be separate and accessed through other interface systems. Modem 247 may provide a direct connection to a remote server via a telephone link or to the Internet via an Internet service provider (ISP). Network interface 248 may provide a direct connection to a remote server via a direct network link to the Internet via a POP (point of presence). Network interface 248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 2 need not be present to practice the present disclosure. The devices and subsystems can be interconnected in different ways from that shown in FIG. 2. Code to implement the present disclosure may be stored in computer-readable storage media such as one or more of system memory 217, fixed disk 244, optical disk 242, or floppy disk 238. Code to implement the present disclosure may also be received via one or more interfaces and stored in memory. The operating system provided on computer system 210 may be MS-DOS®, MS-WINDOWS®, OS/2®, OS X®, UNIX®, Linux®, or another known operating system.

Power manager 250 may monitor a power level of battery 252. Power manager 250 may provide one or more APIs (Application Programming Interfaces) to allow determination of a power level, of a time window remaining prior to shutdown of computer system 200, a power consumption rate, an indicator of whether computer system is on mains (e.g., AC Power) or battery power, and other power related information. According to some embodiments, APIs of power manager 250 may be accessible remotely (e.g., accessible to a remote backup management module via a network connection). According to some embodiments, battery 252 may be an Uninterruptable Power Supply (UPS) located either local to or remote from computer system 200. In such embodiments, power manager 250 may provide information about a power level of an UPS.

Figure 3:
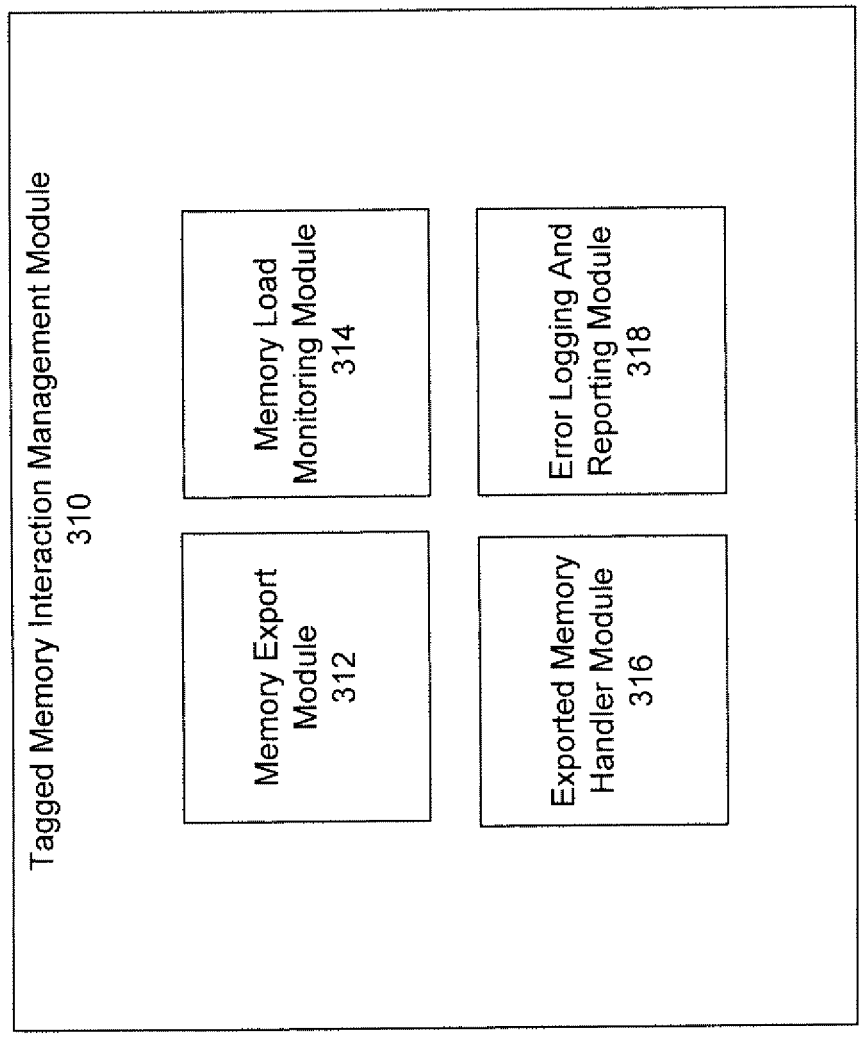
FIG. 3 shows a module for inter-virtual machine communication in accordance with an embodiment of the present disclosure.

Referring to FIG. 3, there is shown a tagged memory interaction management module 310 in accordance with an embodiment of the present disclosure. As illustrated, the tagged memory interaction management module 310 may contain one or more components including memory export module 312, memory load monitoring module 314, exported memory handler module 316, and error logging and reporting module 318.

The description below describes network elements, computers, and/or components of a system and method for inter-virtual machine communication that may include one or more modules. As used herein, the term "module" may be understood to refer to computing software, firmware, hardware, and/or various combinations thereof. Modules, however, are not to be interpreted as software which is not implemented on hardware, firmware, or recorded on a processor readable recordable storage medium (i.e., modules are not software per se). It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

Memory export module 312 may export one or more portions of memory from a guest virtual machine using a specified format or convention agreed upon with a virtualization management component (e.g., secure virtual machine 158). An exported memory structure from a guest virtual machine may provide information to a secure virtual machine or may allow a secure virtual machine to set one or more parameters. For example, Memory export module 312 may reside in a guest virtual machine and may export a memory structure containing information about one or more processes running on the guest virtual machine (e.g., virus scanning processes, antivirus update processes, etc.). Guest virtual machines may also provide other data in exported memory structures.

Memory export module 312 may also export a memory structure containing one or more parameters which may be settable by a secure virtual machine. For example, Memory export module 312 may export a tagged memory structure which may provide one or more parameters that may govern resource consumption of a process running on the guest virtual machine. Other tagged memory structures may be exported controlling other processes of a virtual machine.

Memory load monitoring module 314 may detect memory structures using an agreed upon or specified format. Memory load monitoring module 314 may reside on a secure virtual machine. Memory load monitoring module 314 may consume or read such exported memory structures. Consumption of exported memory structures may allow a secure virtual machine to monitor the number, type, and status of one or more processes on a guest virtual machine. Memory load monitoring module 314 may detect memory structures using a specified format and may set one or more parameters in the exported memory structures. According to some embodiments, upon detection of a tagged control block, Memory load monitoring module 314 may use information in the tagged control block to determine a specific handler. For example, the tagged control blocks may each begin with a standard header that may include three pieces of information:

1. A version so that a particular format, naming convention, or scheme can be identified.
2. A type string.
3. The length of type specific data to follow.

The type string may specify a name associated with a specific type of tagged control block. The name may be used by Memory load monitoring module 314 to call or instantiate a particular handler for that type.

According to some embodiments, Memory load monitoring module 314 may watch for image loads of EXEs and DLLs in the guest VMs (GVMs). Memory load monitoring module 314 may look for exports with a specific naming convention. Software developers may support the naming convention in software run on a guest virtual machine and processes of this software may export memory structures to communicate with a management component such as, for example, a secure virtual machine. The exports may be data structures that can contain data that is meant for the secure virtual machine (SVM) to consume or to populate (or both). According to some embodiments, the exported data structures named according to the convention can be called "tagged control blocks".

Exported memory handler module 316 may be one or more specific handlers to handle a particular type of tagged memory structure (e.g., a tagged control block). Exported memory handler module 316 may reside on a secure virtual machine. There may be a plurality of different handlers each designed to handle a particular type of tagged memory structure. This may allow for easy extensibility and flexibility of the tagged memory communication scheme. An Exported memory handler module 316 may consume and/or populate a tagged memory structure referred to it.

Error logging and reporting module 318 may produce logs, reports, or other information associated with inter-virtual machine communication.

Figure 4:
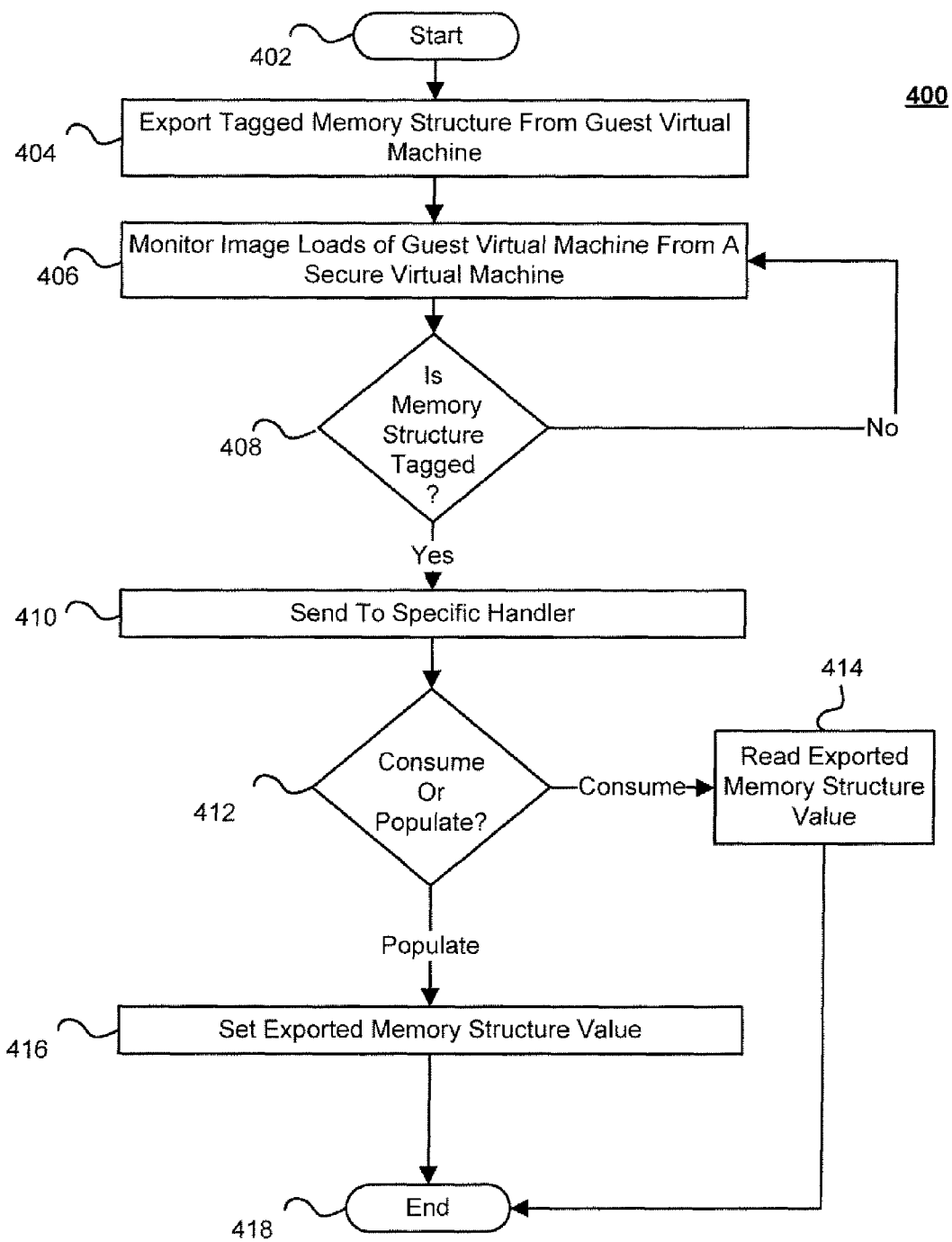
FIG. 4 depicts a method for inter-virtual machine communication in accordance with an embodiment of the present disclosure.

Referring to FIG. 4, there is depicted a method 400 for inter-virtual machine communication in accordance with an embodiment of the present disclosure. At block 402, the method 400 may begin.

At block 404, tagged memory structures may be exported from a guest virtual machine using a specified tagging format.

At block 406, image loads of a guest virtual machine may be monitored from a secure virtual machine. According to some embodiments, scanning of image loads may occur only for image loads of processes implementing the tagged memory communication scheme. A table or other memory structure of such processes may be available to a secure virtual machine.

At block 408, a secure virtual machine may determine whether a tagged memory structure has been identified in an image load. The tagged memory structure may be, for example, a tagged control block. For example, the naming convention or format may use exported memory structures whose names may start with "SymSVM_". Exported memory structures may each be in their own page, aligned to start the first byte of the page, and the pages housing the exported tagged control blocks may be marked as non-pageable. If a tagged memory structure is detected the method may continue at block 410. If a tagged memory structure is not detected, the method may return to block 406.

At block 410, an identified tagged memory structure may be sent to a specific handler or a specific handler may be instantiated or called and provided with an address of the tagged memory structure. A handler may be determined by a type of tagged memory structure. There may be a lookup mapping a tagged memory structure type to a handler, a specific convention mapping a tagged memory structure to a handler, or another method of identifying a handler for particular type of tagged memory structure.

At block 412, the specific handler may determine whether to consume or populate the tagged memory structure (e.g., read data or set data values). According to some embodiments both may be done. If the tagged memory structure is to be read, the method may continue at block 414. If the tagged memory structure is to be populated, the method may continue at block 416.

At block 414, a handler for the specific type of tagged memory structure may read an exported control structure value. For example, a memory structure may contain information about one or more processes running on a guest virtual machine (e.g., virus scanning processes, antivirus update processes, etc.).

At block 416, a exported memory structure value or parameter may be set or populated. For example, a value may be populated which may provide one or more parameters that may govern resource consumption of a process running on a guest virtual machine. Other tagged memory structures may be exported controlling other processes of a virtual machine.

At block 418, the method 400 may end.

Figure 5:
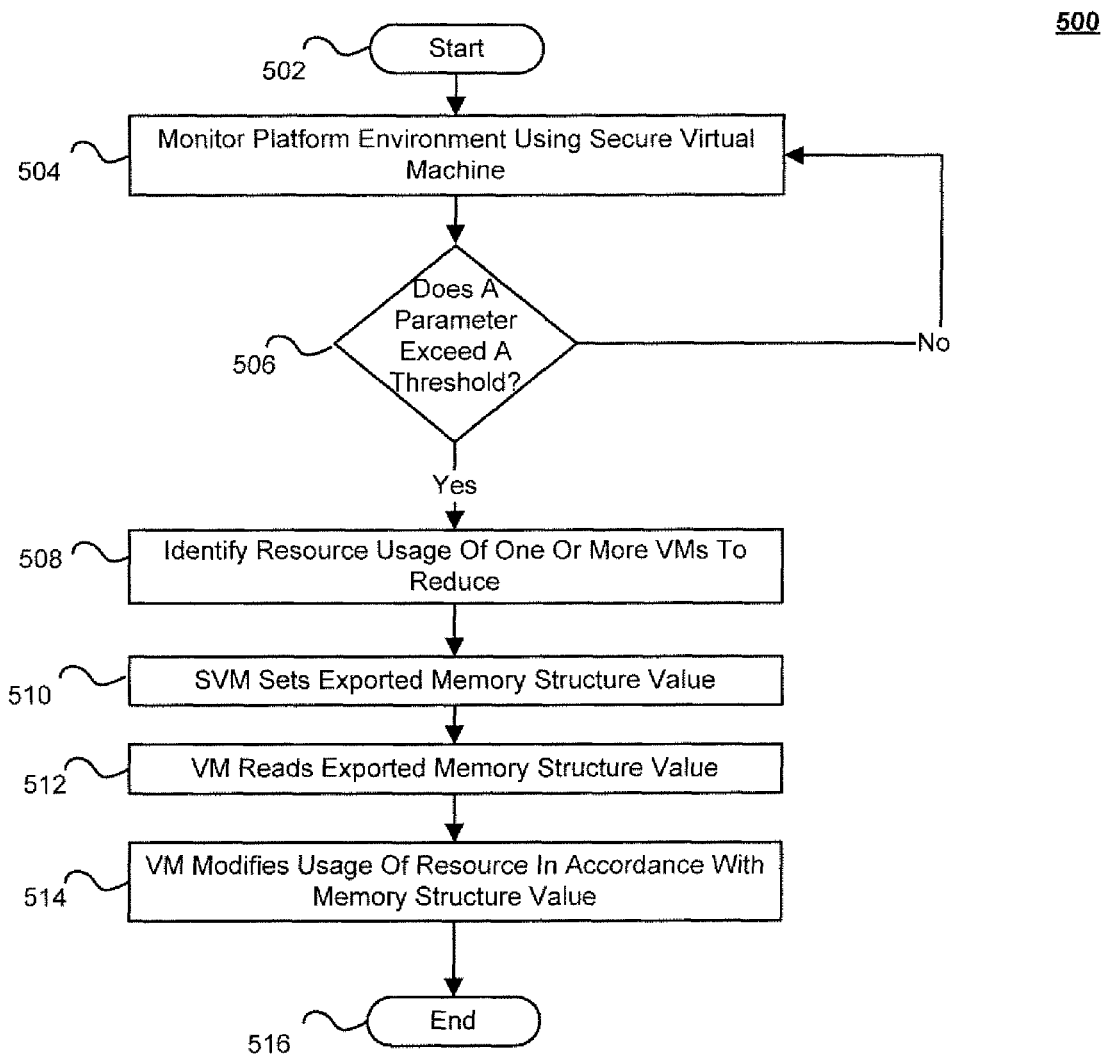
FIG. 5 depicts a method for inter-virtual machine communication in accordance with an embodiment of the present disclosure

Referring to FIG. 5, there is depicted a method 500 for inter-virtual machine communication in accordance with an embodiment of the present disclosure. At block 502, the method 500 may begin.

At block 504, a secure virtual machine or other management component of a virtualization platform may monitor platform environment status indicators (e.g., CPU utilization, memory utilization, network utilization, and storage utilization). The secure virtual machine may have access to platform resource information which may be unavailable to guest virtual machines. According to some embodiments, a Secure virtual machine may also use one or more hypervisor APIs to monitor memory loads of a guest virtual machine.

At block 506, it may be determined whether a parameter indicating utilization exceeds a specified threshold. According to some embodiments, one or more utilization thresholds may be specified such as, for example, a maximum CPU utilization, a maximum memory utilization, or other thresholds. If a threshold is met or exceeded, the method may continue at block 508. If a threshold is not met or exceeded the method may return to block 504.

At block 508, the method may determine whether resource utilization of one or more virtual machines may be decreased. The method may use information about running processes on guest virtual machines which may have been provided by a guest virtual machine exporting tagged memory structures containing process data. According to some embodiments, data about guest virtual machine process priority may be used which may aid in the identification of a guest virtual machine process. According to some embodiments a guest virtual machine process may be identified which is the most resource intensive among identified guest virtual machine processes. Other factors may be used to identify a guest virtual machine process (e.g., a process start time, an estimated process completion time, etc.).

At block 510, a secure virtual machine may populate a value in an exported memory structure corresponding to the identified guest virtual machine process. Populated values may be used to signal to a guest virtual machine process to reduce consumption, to halt consumption, or for other purposes. For example, a populated value or parameter may be a "throttle value" in which any value above zero indicates a reduction in resource consumption (e.g., a parameter may express a time to wait in milliseconds between actions such as file scans). Other values may provide other process input. For example, a parameter may be set indicating that a process on a guest virtual machine is to halted or suspended.

At block 512, the guest virtual machine may read the populated exported memory structure value.

At block 514, the guest virtual machine may modify usage of a resource (e.g., CPU) in accordance with the populated memory structure value. For example, the virtual machine process may implement a pause or a wait in between iterations of the process.

At block 516, the method 500 may end.

At this point it should be noted that inter-virtual machine communication in accordance with the present disclosure as described above typically involves the processing of input data and the generation of output data to some extent. This input data processing and output data generation may be implemented in hardware or software. For example, specific electronic components may be employed in an inter-virtual machine communication module or similar or related circuitry for implementing the functions associated with inter-virtual machine communication in accordance with the present disclosure as described above. Alternatively, one or more processors operating in accordance with instructions may implement the functions associated with inter-virtual machine communication in accordance with the present disclosure as described above. If such is the case, it is within the scope of the present disclosure that such instructions may be stored on one or more processor readable storage media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A method for interaction with a guest virtual machine comprising:
monitoring, on a physical platform hosting a virtualization environment, at least one image load into electronic memory of a guest virtual machine (GVM) using a secure virtual machine (SVM), wherein the GVM and the SVM run on a hypervisor of the virtualization environment and the SVM is a management component of the virtualization environment, the monitoring comprising scanning exported data structures in the loaded image;
identifying, by the SVM, one or more tagged control blocks in the scanned data structures, wherein a tagged control block comprises a data structure which follows a predefined naming convention specific to the SVM and which contains data meant for the SVM to consume and/or populate in order to implement a tagged memory communication scheme between the GVM and the SVM; and
performing, using the SVM, at least:
reading one or more portions of the identified tagged control blocks; and
setting a value in one or more of the identified tagged control blocks.

2. The method of claim 1, wherein the image load comprises at least one of: a load of an executable file and a load of a dynamic link library.

3. The method of claim 1, further comprising:
identifying a handler to handle one or more of the identified tagged control blocks based at least in part on a portion of data in the identified tagged control blocks.

4. The method of claim 3, wherein the portion of data in the identified tagged control block further comprises a header portion including at least one of: version data indicating a particular version of inter-virtual machine communication syntax; a type string indicating a type of inter-virtual machine communication; and length data indicating a length of the communication data.

5. The method of claim 1, further comprising:
reading the value set in the one or more of the identified tagged control blocks using the GVM; and
performing at least one action in response to reading the value.

6. The method of claim 1, further comprising:
monitoring one or more platform environment attributes of the physical platform using the SVM.

7. The method of claim 6, wherein the one or more platform environment attributes comprise at least one of: CPU utilization, memory utilization; network utilization; and storage utilization.

8. The method of claim 6, further comprising:
determining that the one or more platform environment attributes exceed a specified threshold;
identifying a GVM process for which resource consumption will be reduced;
setting a value in an identified tagged control block corresponding to the identified GVM process;
reading the value set in the identified tagged control block corresponding to the identified GVM process using the GVM; and
performing at least one action by the GVM in response to reading the value set in the identified tagged control block to reduce resource consumption by the identified GVM process.

9. The method of claim 8, wherein the value set in the identified tagged control block comprises a setting indicating a configurable throttle value to the identified GVM process, the configurable throttle value causing the identified GVM process to reduce usage of CPU resources proportionate to the configurable throttle value.

10. The method of claim 8, wherein the GVM process comprises at least one of a virus scanning process, an antivirus update process, a data backup process, and a data restoration process.

11. The method of claim 8, wherein identifying a GVM process for which resource consumption will be reduced comprises using GVM process information provided via the tagged memory communication scheme to the SVM.

12. The method of claim 1, wherein monitoring the at least one image load into electronic memory of a GVM using a SVM comprises detecting loading of a process known by the SVM to implement the tagged memory communication scheme.

13. The method of claim 1, wherein reading one or more portions of the identified tagged control blocks comprises reading exported GVM process information.

14. The method of claim 13, wherein the exported GVM process information comprises a current number of copies of a particular process running on the GVM.

15. An article of manufacture for interaction with a guest virtual machine, the article of manufacture comprising:
- at least one non-transitory processor readable medium; and
- instructions stored on the at least one medium; wherein the instructions are configured to be readable from the at least one medium by at least one processor and thereby cause the at least one processor to operate so as to:
  - monitor, on a physical platform hosting a virtualization environment, at least one image load into electronic memory of a guest virtual machine (GVM) using a secure virtual machine (SVM), wherein the GVM and the SVM run on a hypervisor of the virtualization environment and the SVM is a management component of the virtualization environment, the monitoring comprising scanning exported data structures in the loaded image;
  - identify, by the SVM, one or more tagged control blocks in the scanned data structures, wherein a tagged control block comprises a data structure which follows a predefined naming convention specific to the SVM and which contains data meant for the SVM to consume and/or populate in order to implement a tagged memory communication scheme between the GVM and the SVM; and
  - perform, using the SVM, at least:
    - reading one or more portions of the identified tagged control blocks; and
    - setting a value in one or more of the identified tagged control blocks.

16. A system hosting a virtualization environment and for interaction with a guest virtual machine comprising:
- one or more processors communicatively coupled to a network; wherein the one or more processors are configured to:
  - monitor at least one image load into electronic memory of a guest virtual machine (GVM) using a secure virtual machine (SVM), wherein the GVM and the SVM run on a hypervisor of the virtualization environment and the SVM is a management component of the virtualization environment, the monitoring comprising scanning exported data structures in the loaded image;
  - identify, by the SVM, one or more tagged control blocks in the scanned data structures, wherein a tagged control block comprises a data structure which follows a predefined naming convention specific to the SVM and which contains data meant for the SVM to consume and/or populate in order to implement a tagged memory communication scheme between the GVM and the SVM; and
  - perform, using the SVM, at least:
    - reading one or more portions of the identified tagged control blocks; and
    - setting a value in one or more of the identified tagged control blocks.

17. The system of claim 16, wherein the one or more processors are further configured to:
- read the value set in the one or more of the identified tagged control blocks using the GVM; and
- perform at least one action by the GVM in response to reading the value.

\* \* \* \* \*